(12) United States Patent
Park et al.

(10) Patent No.: US 11,540,097 B2
(45) Date of Patent: Dec. 27, 2022

(54) METHOD AND APPARATUS FOR TRANSMITTING AND RECEIVING SIGNALS IN WIRELESS VEHICLE COMMUNICATION SYSTEM

(71) Applicant: Samsung Electronics Co., Ltd., Gyeonggi-do (KR)

(72) Inventors: Sungjin Park, Gyeonggi-do (KR); Jeongho Yeo, Gyeonggi-do (KR); Jinyoung Oh, Gyeonggi-do (KR); Taehan Bae, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/429,966

(22) Filed: Jun. 3, 2019

(65) Prior Publication Data
US 2019/0373427 A1    Dec. 5, 2019

(30) Foreign Application Priority Data

Jun. 1, 2018    (KR) ........................ 10-2018-0063756

(51) Int. Cl.
*H04W 4/40*    (2018.01)
*H04W 72/04*    (2009.01)

(52) U.S. Cl.
CPC ........... *H04W 4/40* (2018.02); *H04W 72/044* (2013.01)

(58) Field of Classification Search
CPC ... H04W 4/40; H04W 72/044; H04W 72/048; H04W 72/042; H04L 5/0032; H04L 5/0007
See application file for complete search history.

(56) References Cited

U.S. PATENT DOCUMENTS

| | | | |
|---|---|---|---|
| 2005/0030202 A1* | 2/2005 | Tsuboi | G08G 1/096758 340/901 |
| 2011/0222491 A1* | 9/2011 | Vajapeyam | H04L 1/0072 370/329 |
| 2014/0153472 A1* | 6/2014 | Phan | H04B 7/15 370/312 |
| 2016/0073298 A1 | 3/2016 | Brahmi et al. | |

(Continued)

FOREIGN PATENT DOCUMENTS

| | | |
|---|---|---|
| EP | 3 522 471 | 8/2019 |
| WO | WO 2014/198325 | 12/2014 |

(Continued)

OTHER PUBLICATIONS

International Search Report dated Sep. 9, 2019 issued in counterpart application No. PCT/KR2019/006657, 10 pages.

(Continued)

*Primary Examiner* — Christine Ng
(74) *Attorney, Agent, or Firm* — The Farrell Law Firm, P.C.

(57) ABSTRACT

A method and apparatus for transmitting and receiving signals in a wireless vehicle communication system. The method, performed by a UE, includes obtaining vehicle communication configuration information, determining, for vehicle communication, at least one of whether data is to be (Continued)

relayed, allocated resources, or a waveform, based on the obtained vehicle communication configuration information, and transmitting or receiving signals to or from at least one other UE based on the determination result.

20 Claims, 9 Drawing Sheets

(56) References Cited

U.S. PATENT DOCUMENTS

| | | | |
|---|---|---|---|
| 2016/0212731 A1* | 7/2016 | Zhang | H04L 5/0055 |
| 2016/0286404 A1* | 9/2016 | Rico Alvarino | H04L 5/001 |
| 2016/0295624 A1 | 10/2016 | Novlan et al. | |
| 2016/0353429 A1* | 12/2016 | Wang | H04W 72/0453 |
| 2017/0099624 A1* | 4/2017 | Baghel | H04W 36/0072 |
| 2017/0188391 A1 | 6/2017 | Rajagopal et al. | |
| 2017/0237533 A1 | 8/2017 | Lee et al. | |
| 2017/0325214 A1 | 11/2017 | Lu et al. | |
| 2018/0098369 A1* | 4/2018 | Yasukawa | H04W 72/10 |
| 2018/0132244 A1 | 5/2018 | Huang et al. | |
| 2018/0234889 A1* | 8/2018 | Baghel | H04W 72/06 |
| 2018/0279292 A1* | 9/2018 | Luo | H04L 1/0028 |
| 2018/0323947 A1* | 11/2018 | Brunel | H04L 27/2614 |
| 2019/0124491 A1* | 4/2019 | Lim | H04W 52/146 |
| 2019/0182812 A1 | 6/2019 | Shimezawa et al. | |
| 2019/0281644 A1* | 9/2019 | Hu | H04W 72/085 |
| 2019/0297619 A1 | 9/2019 | Liu et al. | |
| 2019/0342888 A1* | 11/2019 | Hosseini | H04W 72/005 |
| 2019/0373617 A1* | 12/2019 | Sun | H04W 88/02 |
| 2020/0154397 A1* | 5/2020 | Kim | H04W 72/0406 |

FOREIGN PATENT DOCUMENTS

| | | |
|---|---|---|
| WO | WO 2018/062717 | 4/2018 |
| WO | WO 2018/082600 | 5/2018 |
| WO | WO 2018/083957 | 5/2018 |

OTHER PUBLICATIONS

Beijing Xinwei Telecom Techn., "Discussion on Enhancement of V2X Resource Allocation", R1-157534, 3GPP TSG RAN WG1 Meeting #83, Nov. 15-22, 2015, 8 pages.
Vodafone, "Summary of Email Discussion on NR V2X Study Item", RP-180426, 3GPP TSG RAN #79, Mar. 19-22, 2018, 27 pages.
European Search Report Sep. 11, 2020 issued in counterpart application No. 19810579.3-1220, 12 pages.
European Search Report dated Jan. 25, 2021 issued in counterpart application No. 19810579.3-1220, 15 pages.
European Search Report dated May 10, 2022 issued in counterpart application No. 19810579.3-1224, 5 pages.
Korean Office Action dated May 20, 2022 issued in counterpart application No. 10-2016-0663766, 10 pages.
Indian Examination Report dated Sep. 19, 2022 issued in counterpart application No. 202037008488, 6 pages.

* cited by examiner

METHOD AND APPARATUS FOR TRANSMITTING AND RECEIVING SIGNALS IN WIRELESS VEHICLE COMMUNICATION SYSTEM

CROSS-REFERENCE TO RELATED APPLICATION

This application is based on and claims priority under 35 U. S. C. § 119 to Korean Patent Application No. 10-2018-0063756, filed on Jun. 1, 2018 in the Korean Intellectual Property Office, the entire disclosure of which is incorporated herein by reference.

BACKGROUND

1. Field

The disclosure relates generally to a wireless vehicle communication system, and more particularly, to a method and apparatus for transmitting and receiving signals in a wireless vehicle communication system.

2. Description of Related Art

To meet the increasing demand with respect to wireless data traffic since the commercialization of 4th generation (4G) communication systems, efforts have been made to develop advanced 5th generation (5G) or new radio (NR) communication systems. To achieve high data rates, 5G communication systems are designed to support ultra-high frequency or millimeter-wave (mmWave) bands (e.g., a 28-GHz band).

To reduce path loss and increase transmission distances of data in the ultra-high frequency bands for 5G communication systems, various technologies such as beamforming, massive multiple-input and multiple-output (massive MIMO), full-dimension MIMO (FD-MIMO), array antennas, analog beamforming, and large-scale antennas are being studied. Unlike long term evolution (LTE) communication systems, 5G communication systems support various sub-carrier spacings such as 15 kHz, 30 kHz, 60 kHz, and 120 kHz, and use polar coding for physical control channels and use low-density parity-check (LDPC) coding for physical data channels. As waveforms for uplink (UL) transmission, discrete Fourier transform-spread-orthogonal frequency division multiplexing (DFT-s-OFDM) and cyclic prefix-OFDM (CP-OFDM) are used. LTE communication systems may support hybrid automatic repeat request (HARQ) retransmission in units of a transport block (TB), whereas 5G communication systems may additionally support HARQ retransmission based on a code block group (CBG) including a plurality of code blocks (CBs).

To improve system networks for 5G communication systems, various technologies such as evolved small cells, advanced small cells, cloud radio access networks (RANs), ultra-dense networks, device-to-device (D2D) communication, wireless backhaul, vehicle-to-everything (V2X) networks, cooperative communication, coordinated multi-points (CoMP), and interference cancellation have been developed.

The Internet has evolved to the Internet of things (IoT), where distributed elements such as objects exchange and process information. Internet of everything (IoE) technology has emerged, in which the IoT technology is combined with, e.g., technology for processing big data through connection with a cloud server. Various technological elements such as sensing technology, wired/wireless communication and network infrastructures, service interface technology, and security technology are required to implement the IoT, and technologies related to sensor networks, machine-to-machine (M2M) communication, and machine-type communication (MTC) for connecting objects have recently been studied. In the IoT environment, intelligent Internet technology (IT) services may be provided to collect and analyze data obtained from connected objects to create new value in human life. As existing information technology and various industries converge and combine with each other, the IoT may be applied to various fields such as smart homes, smart buildings, smart cities, smart cars or connected cars, smart grids, healthcare, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud-RAN as the above-described big data processing technology is an example of convergence of 5G communication technology and IoT technology. A plurality of services may be provided to users in the above-described communication systems, and a method capable of providing different services within the same time period based on features of the services, and an apparatus using the method are required to provide the plurality of services to the users. Various services provided by the 5G communication systems are being studied. An example of which is a service capable of satisfying requirements for low latency and high reliability. Such a service may be referred to as "ultra-reliable and low-latency communication (URLLC)".

As another example, V2X is a generic term for all types of communication applicable to vehicles, and refers to a specific communication technology for implementing a "connected vehicle" or a "networked vehicle". V2X networking is commonly divided into three types, i.e., vehicle-to-infrastructure (V2I) communication, vehicle-to-vehicle (V2V) communication, and vehicle-to-pedestrian (V2P) communication.

Various services are able to be provided due to the development of wireless communication systems as described above, and thus a method capable of appropriately providing such services is required.

SUMMARY

The disclosure is designed to address at least the problems and/or disadvantages described above and to provide at least the advantages described below.

Accordingly, an aspect of the disclosure is to provide a method for transmitting and receiving signals in a wireless vehicle communication system by determining a vehicle communication method using vehicle communication configuration information.

In accordance with an aspect of the disclosure, a signal transmission and reception method is provided for a user equipment (UE) in a wireless vehicle communication system. The method includes obtaining vehicle communication configuration information, determining, for vehicle communication, at least one of whether data is to be relayed, allocated resources, or a waveform, based on the obtained vehicle communication configuration information, and transmitting or receiving signals to or from at least one other UE based on the determination result.

In accordance with another aspect of the disclosure, a UE is provided for transmitting and receiving signals in a wireless vehicle communication system. The UE includes a transceiver, and a processor configured to obtain vehicle communication configuration information, determine, for vehicle communication, at least one of whether data is to be relayed, allocated resources, or a waveform, based on the obtained vehicle communication configuration information, and transmit or receive signals to or from at least one other UE based on the determination result.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
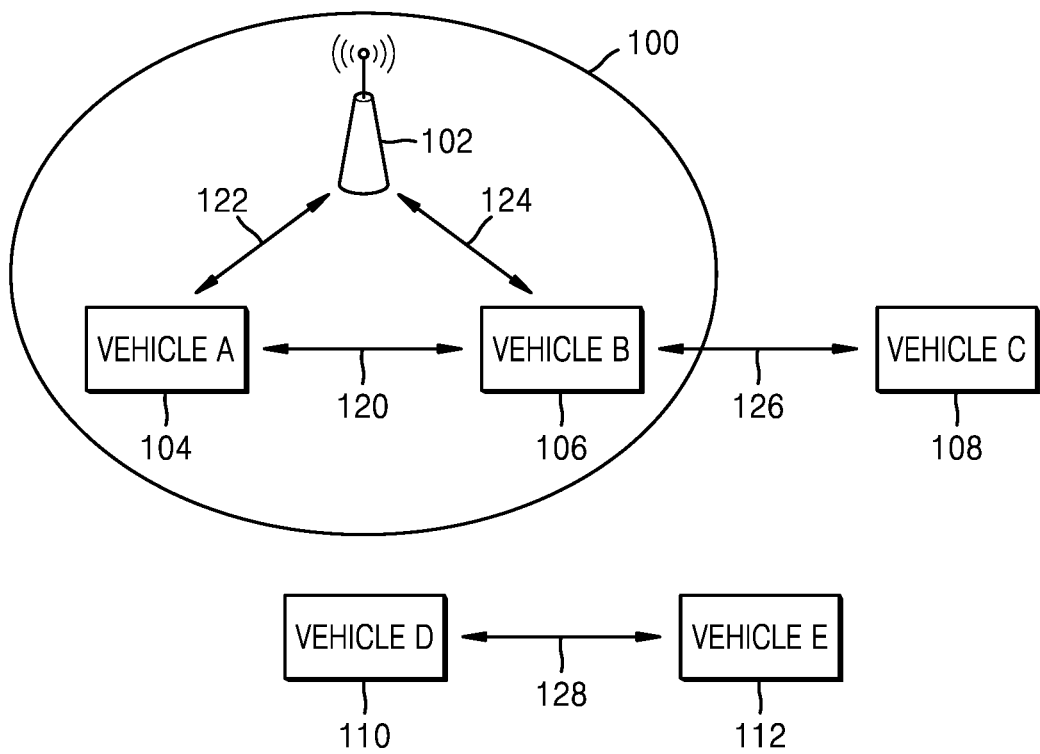
FIG. 1 illustrates a vehicle communication environment.

Various embodiments of the disclosure will now be described in detail with reference to the accompanying drawings. In the following description, specific details such as detailed configuration and components are provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Throughout the disclosure, the expression "at least one of a, b or c" indicates only a, only b, only c, both a and b, both a and c, both b and c, all of a, b, and c, or variations thereof.

Elements may be exaggerated, omitted, or schematically illustrated in the drawings. Also, the size of each element does not completely reflect a real size thereof. In the drawings, like reference numerals denote like elements.

Blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). In some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. A unit may be formed so as to be in an addressable storage medium, or may be formed so as to operate one or more processors. Thus, for example, a unit may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and units may be combined into the smaller number of elements and units, or may be divided into additional elements and units. Further, the elements and units may be embodied to reproduce one or more central processing units (CPUs) in a device or security multimedia card. Also, a unit may include at least one processor.

Wireless communication systems providing voice-based services are being developed to broadband wireless communication systems providing high-speed and high-quality packet data services according to communication standards such as high speed packet access (HSPA), LTE or evolved universal terrestrial radio access (E-UTRA), LTE-advanced (LTE-A), LTE-pro of 3GPP, high rate packet data (HRPD) and ultra mobile broadband (UMB) of 3GPP2, and 802.16e of the Institute of Electrical and Electronics Engineers (IEEE). In addition, to meet the increasing demand with respect to wireless data traffic since the commercialization of 4G communication systems, efforts have been made to develop advanced 5G or NR communication systems.

As a representative example of the broadband wireless communication systems, LTE systems employ OFDM for a downlink (DL), and employs single carrier-frequency division multiple access (SC-FDMA) for a UL. The UL refers to a radio link for transmitting data or a control signal from a terminal, a UE, or a mobile station (MS) to a gNodeB or a base station (BS), and the DL refers to a radio link for transmitting data or a control signal from a gNodeB or a BS to a terminal, a UE, or an MS.

The above-described multi-connectivity schemes distinguish between data or control information of different users by allocating and operating time-frequency resources carrying the data or control information of the users, not to overlap with each other, i.e., to achieve orthogonality therebetween.

LTE systems employ a HARQ scheme by which a physical layer retransmits data failed to be decoded at an initial transmission. In the HARQ scheme, when a receiver has not accurately decoded data, the receiver may transmit information indicating the failure of decoding, e.g., negative acknowledgement (NACK), to a transmitter in such a manner that a physical layer of the transmitter may retransmit the data. The receiver increases the performance of data reception by combining the data retransmitted from the transmitter, with the data previously failed to be decoded. When the receiver has accurately decoded data, the receiver may transmit information indicating the success of decoding, e.g., acknowledgement (ACK), to the transmitter in such a manner that the transmitter may transmit new data.

NR systems support various evolved technologies compared to the LTE systems. Unlike the LTE systems, the NR systems may provide various subcarrier spacings and transmit data in units of a symbol or a symbol group other than a subframe. In addition, the NR systems may retransmit not in units of a TB but in units of a group of some code blocks, i.e., a CBG. Further, the NR systems may flexibly configure a HARQ-ACK timing and a scheduling timing.

NR-V2X or 5G-V2X communication standards based on enhanced NR communication designs are being studied. V2X communication is commonly divided into V2I communication between a vehicle and a BS, V2V communication between a vehicle and another vehicle(s), and V2P communication between a vehicle and a person (or a UE). These three types of communication may be generically referred to as V2X.

In vehicle communication, LTE-based V2X based on a D2D communication structure has been defined in the 3GPP standards Rel-14 and Rel-15. The biggest difference of V2X communication from D2D communication is a method of duplexing control information and data information. D2D basically supports time division multiplexing (TDM) whereas LTE-based V2X supports frequency division multiplexing (FDM). Efforts are being made to develop NR-based V2X communication technology based on 5G NR communication technology to be initially disclosed in 3GPP Rel-15. Unlike LTE-based V2X communication, which is directed to transmit and receive basic safety information required for driving of vehicles, NR-based V2X communication is directed to provide usability in four main vehicle driving environments, such as platooning, advanced driving, extended sensors, and remote driving. To support this, the NR-based V2X communication structure will be designed to achieve a lower latency and a higher reliability. In vehicle communication, necessity for URLLC between vehicles or between a vehicle and a BS is increased considering that the vehicles move at high speeds.

Accordingly, an embodiment of the disclosure provides a method and apparatus for simultaneously providing different types (or the same type) of services. A method is provided by which a receiver vehicle relays data in a V2V communication environment based on whether the data is successfully received. A method is also provided for configuring resources for vehicle communication when frequency bands for LTE-V2X and NR-V2X coexist. A method is also provided for configuring a transmission and reception waveform for V2V communication. V2V communication may be replaced by V2X communication.

The disclosure is not limited to a specific communication environment and considers V2X applicable to all communication environments.

As used herein, the term "vehicle" is applicable to UEs and all other devices supporting wireless data communication. UE-common control information may refer to system common information transmittable through a physical broadcast channel (PBCH) or a physical downlink shared channel (PDSCH), e.g., master information block (MIB), system information block (SIB), and remaining system information (RMSI), or to UE-group control information transmittable through a physical downlink control channel (PDCCH) serving as a UE-group physical control channel (e.g., downlink control information (DCI) formats 2_x of NR). UE-specific control information may refer to UE-specific upper-layer control information transmittable through UE-specific upper-layer signaling (e.g., radio resource control (RRC) signaling), or UE-specific control information transmittable through a PDCCH (e.g., DCI formats 0_x or DCI formats 1_x of NR).

FIG. 1 illustrates a vehicle communication environment.

Referring to FIG. 1, a vehicle A 104 and a vehicle B 106 are located within a range where data communication of a BS 102 is enabled. However, a vehicle C 108, a vehicle D 110, and a vehicle E 112 are located outside of the range where data communication of the BS 102 is enabled. A link 122 and a link 124 may be connected for direct data communication between the vehicle A 104 and the vehicle B 106, and the BS 102. Herein, each of the link 122 and the link 124 may be understood as a DL or a UL. A link 120 may be directly connected between the vehicle A 104 and the vehicle B 106. Herein, the link 120 may be understood as a sidelink (SL).

When the vehicle A 104 has data to be transmitted to other vehicles, the vehicle A 104 may transmit the data via the BS 102 to the vehicle B 106 or another vehicle(s) located within the data communication range of the BS 102. For example, the vehicle A 104 may transmit the data through the UL 122 to the BS 102. The BS 102 may transmit the data received from the vehicle A 104, through the DL 124 to the vehicle B 106. Alternatively, the BS 102 may configure resources for the link 120 and the vehicle A 104 may directly transmit the data through the resources to the vehicle B 106.

When the vehicle A 104 has data to be transmitted to other vehicles, the vehicle A 104 may search resource regions configured using UE-specific or UE-group control information previously received through upper-layer signaling, configured according to the standards, or configured by implementation, without receiving any resource configuration information from the BS 102, find unused resources, and then transmit the data through the resources to the vehicle B 106.

According to Rel-14/15 LTE-V2X, a method of transmitting or receiving data through SL resources allocated by a BS is defined as transmission mode 3, and a method of searching SL resource regions configured using UE-common control information without the aid of a BS and then transmitting or receiving data through specific resource regions determined as being not used is defined as transmission mode 4. When a vehicle is located within a data communication range of a BS, transmission mode 3 and transmission mode 4 may be supported. When the vehicle is located outside the data communication range of the BS, only transmission mode 4 may be supported.

In FIG. 1, it is assumed that the vehicle B 106 and the vehicle C 108 are connected to each other through the SL 126 and that the vehicle B 106 is located within the BS data communication range, whereas the vehicle C 108 is not located within the BS data communication range. In this case, communication between the vehicle B 106 and the vehicle C 108 may be performed through unused resource regions determined by searching resource regions configured using UE-specific or UE-group control information previously received through upper-layer signaling, configured according to the standards, or configured by implementation, without receiving any resource configuration information from the BS 102. The above-described method may also be applied to a data communication procedure through a link 128 between the vehicle D 110 and the vehicle E 112.

Specifically, in a data communication procedure, when a transmitter vehicle transmits control information and data information through specific resources, a receiver vehicle may implicitly check the control information detected by searching the specific resource regions, check information about, for example, a data information transmission structure (e.g., a modulation and coding scheme (MCS)) and data resource regions indicated by the control information, and then receive the data in the data resource regions. However, the above-described method merely corresponds to an example and methods according to the existing LTE or NR standards may also be applied according to another example.

Although the vehicle A 104 may directly transmit the data to the vehicle B 106, the vehicle A 104 may also transmit the data to a plurality of vehicles instead of one vehicle.

The data communication in FIG. 1 may be performed using a unicast, group(multi)cast, or broadcast method. The unicast method may refer to a method of transmitting data from a vehicle to another designated vehicle, the group (multi)cast method may refer to a method of transmitting data from a vehicle to a plurality of designated vehicles, and the broadcast method may refer to a method of transmitting data from a vehicle to a plurality of arbitrary vehicles. The data communication method may be configured using common or specific control information or be determined based on, e.g., a radio network temporary identifier (RNTI) or a service type. For example, a vehicle may identify the configured data communication method based on a RNTI value masked in a cyclic redundancy check (CRC) bit included in UE-common or UE-specific control information previously received from a BS (or another vehicle).

Figure 2:
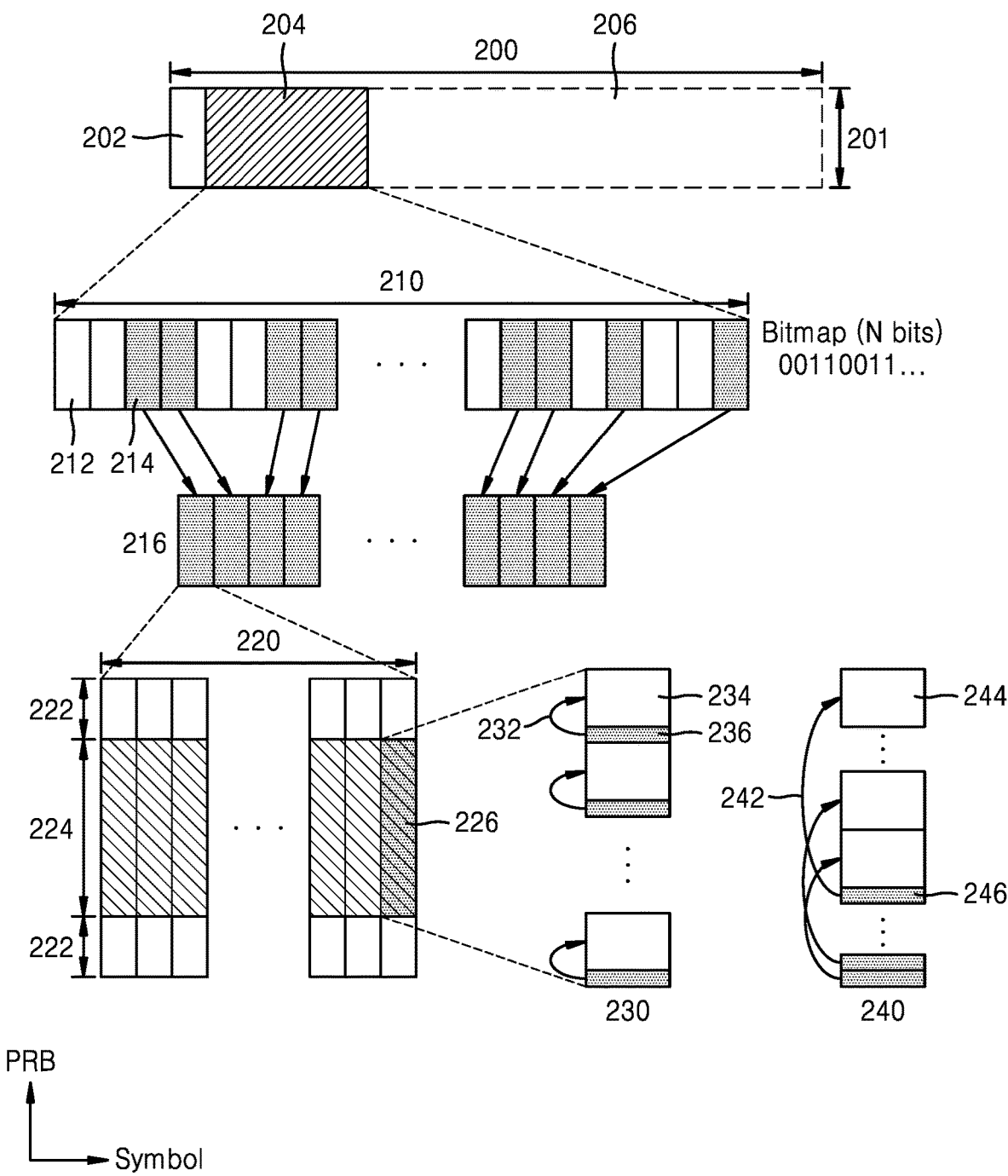
FIG. 2 illustrates a transmission resource structure for vehicle communication.

FIG. 2 illustrates a transmission resource structure for vehicle communication.

Referring to FIG. 2, reference numeral 200 refers to a transmission resource cycle including a group of frames having a specific subcarrier spacing value. In LTE, the value of the transmission resource cycle is set in units of 1024 frames (or 10240 subframes). Reference numeral 201 refers to a UL, an SL, or an unlicensed frequency band. Reference numeral 202 refers to a reserved resource region previously configured for critical information, or may not exist.

Reference numeral 204 refers to an SL resource region for V2V communication. Reference numeral 206 refers to a period in which the SL resource region 204 is repeated, except for frames for a synchronization signal (SS), DL frames, or frames configured as the reserved resource region in a group of frames included in the transmission resource cycle.

Reference numeral 210 refers to a configurable cycle of the SL resource region for V2V communication. The configurable cycle may be set in units of N subframes. In LTE, the value N is set to 10 to 100 based on a time division duplex (TDD) or frequency division duplex (FDD) structure. N bitmaps may be used to determine whether each subframe is used as an SL resource. Specifically, the N bitmaps may be one-to-one mapped to the N subframes to indicate whether each subframe is used as an SL resource. That is, 1 bit may indicate whether 1 subframe is used for the SL. For example, a subframe (e.g., 214) corresponding to a bit having a value 1 is used as an SL resource, and a subframe (e.g., 212) corresponding to a bit having a value 0 is not used as an SL resource. As another example, 1 bit may indicate whether 2 or more subframes are used for the SL.

Reference numeral 216 refers to all logical resource regions of subframes corresponding to bits having a value 1. A specific subframe mapped to 1 bit may include 12 or 14 OFDM symbols based on a cyclic prefix structure.

A frequency band 222 refers to a frequency resource region not used for an SL, and a frequency band 224 refers to a resource region used for an SL. In LTE, the frequency band 222 is used for a physical uplink control channel (PUCCH) or a physical uplink shared channel (PUSCH) for LTE. A transmission resource 226, in LTE, may refer to a resource region through which a sounding reference signal (SRS) is transmitted. Alternatively, the frequency band 222 and the transmission resource 226 may not exist or only one of them may exist.

The frequency band 224 may include a combination of SL control channels (e.g., 236 and 246) and SL data channels (e.g., 234 and 244). Reference numeral 230 illustrates the SL control channels and the SL data channels repeatedly mapped to each other in a frequency axis. Each SL control channel (e.g., 236) may provide control information of an adjacent SL data channel (e.g., 234). Reference numeral 240 illustrates the SL control channels and the SL data channels grouped and mapped to each other in a frequency axis. Each SL control channel (e.g., 246) may provide control information of an SL data channel (e.g., 244) associated with the SL control channel.

The size of the frequency band 224 may be determined based on frequency band offset and length information included in previously received UE-common or UE-specific control information. Alternatively, the size of the frequency band 224 may be determined based on information about the size and the number of frequency bands of the SL control and data channels, or using a combination of the above-described methods.

In FIG. 2, a frame or subframe may be replaced with a slot including 14 (or 12) symbols or a mini-slot including 1 to 13 symbols.

Figure 3:
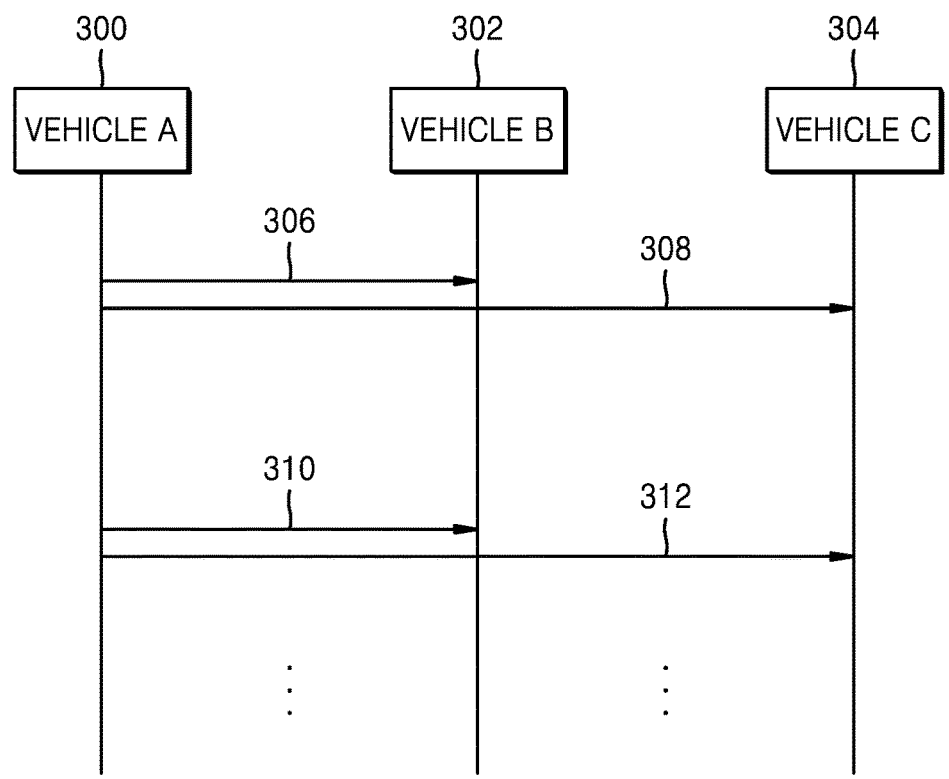
FIG. 3 illustrates a data communication method between UEs, according to an embodiment.

FIG. 3 illustrates a data communication method between UEs, according to an embodiment.

Referring to FIG. 3, in vehicle communication, a vehicle (or a UE or a BS) may transmit data to other vehicles at a specific timing. For example, the vehicle (or the UE or the BS) may transmit the data using a unicast, multicast, or broadcast method. As described above, the unicast method transmits data to only one vehicle, the multicast method transmits data to a plurality of specific vehicles, and the broadcast method transmits data to a plurality of unspecific vehicles.

To support the above-described various communication methods, a communication method may be identified based on an RNTI masked in a CRC bit combined with control information or data information. Alternatively, a communication method may be identified based on UE-common or UE-specific upper-layer control information or L1 control information. That is, a transmitter vehicle may identify whether data information designated by specific elements included in control information is unicast information for a specific receiver vehicle, multicast information for a plurality of specific receiver vehicles, or broadcast information for a plurality of unspecific receiver vehicles.

In FIG. 3, a vehicle A 300 repeatedly transmits data to a vehicle B 302 and a vehicle C 304. The vehicle A 300 may simultaneously transmit data to the vehicle B 302 and the vehicle C 304 in steps 306 and 308. The vehicle A 300 retransmits the previously-transmitted data to the vehicle B 302 and the vehicle C 304 in steps 310 and 312. Although it is assumed in FIG. 3 that the vehicle A 300 repeatedly transmits data two times, the vehicle A 300 may repeatedly transmit data three or more times.

The vehicle A 300 may repeatedly transmit data having the same redundancy version (RV) value or data having different RV values. The vehicle B 302 or the vehicle C 304 may decode the repeatedly received data after or without a combining process. After the data is successfully decoded, the vehicle B 302 or the vehicle C 304 may not receive repeatedly transmitted data, or may receive repeatedly transmitted data but may not decode the data.

Figure 4:
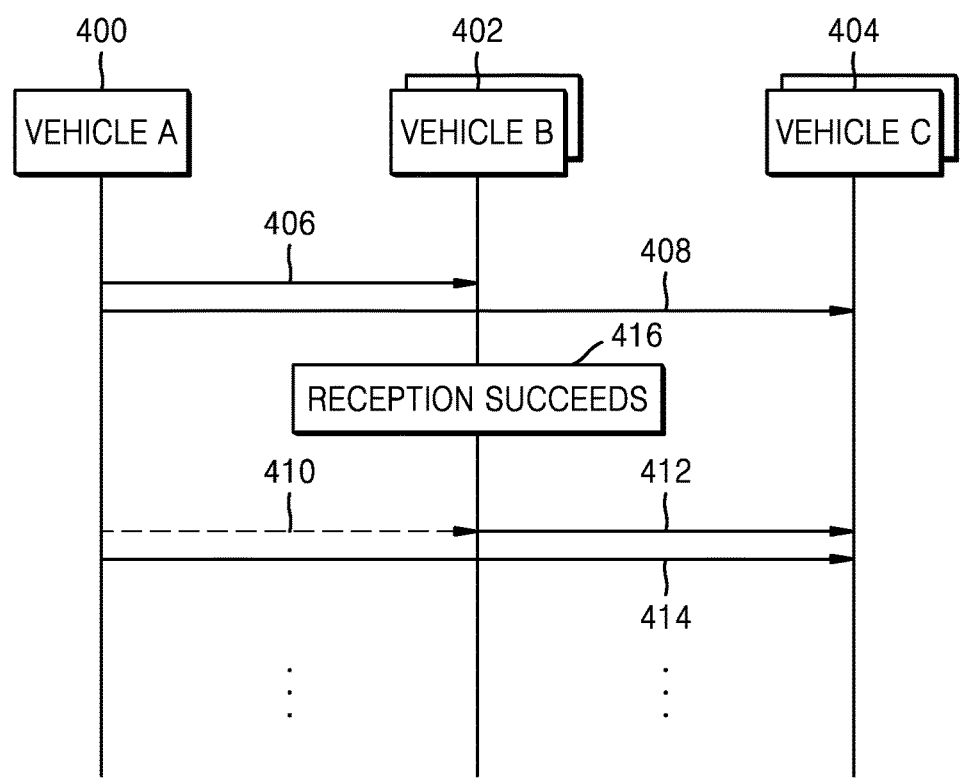
FIG. 4 illustrates a cooperative communication method between UEs, according to an embodiment.

FIG. 4 illustrates a cooperative communication method between UEs, according to an embodiment.

Unlike FIG. 3, FIG. 4 illustrates an enhanced data communication method between vehicles. In FIG. 3, only a transmitter vehicle repeatedly transmits data to increase data decoding performance of receiver vehicles. However, in FIG. 4, in addition to a transmitter vehicle, receiver vehicles having successfully decoded data received from the transmitter vehicle may transmit the data through resources used for repeated transmission of the transmitter vehicle.

For example, the receiver vehicles may relay the previously received data regardless of whether the data is decoded. As another example, the receiver vehicles may relay the data through resources other than the resources used for repeated transmission of the transmitter vehicle. The above-described method by which the receiver vehicles relay the data received from the transmitter vehicle, to other vehicles may be understood as a cooperative communication mode. When the cooperative communication mode is performed, the reliability and a range of data transmission may be increased.

The receiver vehicles may adaptively transmit (or relay) the data received from the transmitter vehicle, to the other vehicles based on a condition. Such a method may include an explicit method and an implicit method. The explicit method determines whether to operate, by using specific information. The implicit method determines whether to operate, based on information other than information indicating whether to operate, when the information indicating whether to operate does not exist.

According to an explicit method, it may be determined whether to operate, by using a field indicating whether to operate (e.g., whether to relay received data), which is included in control information. For example, when the field indicating whether to relay received data exists in the control information and indicates to relay received data, and when received data is successfully decoded, a receiver vehicle may relay the data. The control information may include a media access control (MAC) control element (CE) or RRC configuration information delivered through L2 or L3 signaling. As another example, the control information may include downlink control information delivered through L1 signaling.

As a first implicit method, a method of indicating whether to operate (e.g., whether to relay received data), based on an RNTI scrambled in a CRC bit combined with control information may be used. For example, when a receiver vehicle detects control information scrambled with an RNTI value configured for a group communication method in the vehicle or another specific communication method, the receiver vehicle may determine to relay data information indicated by the control information. The control information may include a MAC CE or RRC configuration information delivered through L2 or L3 signaling. As another example, the control information may include downlink control information delivered through L1 signaling.

As a second implicit method, a method of indicating whether to operate (e.g., whether to relay received data), based on a control information format or a control information transmission channel may be used. For example, it may be determined whether to relay data information indicated by control information, based on whether the control information format is a UE-common control information format or a UE-specific control information format. When the control information received by a receiver vehicle has the UE-common control information format, a large number of vehicles should receive the data information, and thus the receiver vehicle may determine to relay the data information. Otherwise, when the control information received by the receiver vehicle has the UE-specific control information format, only a small number of vehicles need to receive the data information, and thus the receiver vehicle may determine not to relay the data information.

The control information format may be determined based on the control information transmission channel. For example, the receiver vehicle may determine whether to relay the data information, based on whether the control information transmission channel is a UE-common control channel or a UE-specific control channel.

As a third implicit method, a receiver vehicle may determine whether to relay data information indicated by UE-specific control information, based on a value indicated by a specific field from among fields included in the UE-specific control information. For reference, Table 1 below shows SL control information format fields used in LTE.

TABLE 1

| LTE SL control information format field | |
|---|---|
| Field | Meaning |
| Priority | Field indicating data priority |
| Resource reservation | Field indicating resource occupancy for subsequent TB transmission |
| Resource allocation | Field indicating frequency resource allocation information |
| Gap between initial transmission and retransmission | Field indicating time interval between initial transmission and retransmission |
| MCS | Field indicating modulation and coding scheme |
| ReTx | Field indicating whether current transmission is initial transmission or retransmission |

The receiver vehicle may determine whether to relay the data information, based on values indicated by the control information fields shown in Table 1. For example, "ReTx" is a field indicating whether current transmission is initial transmission or retransmission, and includes 1 bit because LTE-V2X allows only two repeated transmissions. When this field indicates initial transmission, the receiver vehicle may determine to relay the data. Otherwise, when this field indicates retransmission, current transmission is last transmission and thus the receiver vehicle may determine not to relay the data.

"Priority" is a field indicating a priority of the transmitted data. When the priority is high (or is equal to or higher than a threshold value), a large number of UEs should receive the data, and thus the receiver vehicle may determine to relay the data. Otherwise, when the priority is low (or is lower than the threshold value), the receiver vehicle may determine not to relay the data.

The above description merely corresponds to an example. As another example, the receiver vehicle may adaptively determine whether to relay the data, based on the control information fields of Table 1 or other SL control information fields.

As a fourth implicit method, a vehicle may determine whether to relay received data, based on whether a data transmission method is a unicast, multicast, or broadcast method. For example, when data received by the vehicle has been transmitted based on the unicast method, the vehicle may determine not to relay the received data. Otherwise, when data received by the vehicle has been transmitted based on the broadcast or multicast method, the vehicle may determine to relay the received data.

As a fifth implicit method, a vehicle may determine whether to relay received data, based on resource regions used for data transmission. The resource regions may refer to resource regions including frequency information or time information. The resource regions may be previously configured by a BS, a service provider, or standards. For example, when data information transmitted through a specific frequency resource region A is successfully received, the vehicle may determine to relay the received data. Even when data information transmitted through a specific frequency resource region B is received, the vehicle may determine not to relay the received data. The frequency resource regions A and B may not overlap with each other. Although frequency resource regions are described above as an example, time resource regions may also be used.

In FIG. 4, a vehicle A 400 may repeatedly transmit data to a vehicle B 402 and a vehicle C 404. The vehicle A 400 may simultaneously transmit the data information to the vehicle B 402 and the vehicle C 404 in steps 406 and 408. The vehicle A 400 retransmits the previously-transmitted data to the vehicle B 402 and the vehicle C 404 in steps 410 and 414. Herein, when the data received from the vehicle A 400 in step 406 is successfully decoded in step 416 and when it is indicated to relay data, based on the above-described explicit or implicit method, the vehicle B 402 may transmit the data information to the vehicle C 404 in step 412 through transmission resources (410 and 414) of the vehicle A 400. As another example, the vehicle B 402 may transmit the data information to arbitrary vehicles through resources other than the transmission resources of the vehicle A 400.

In FIG. 4, a HARQ-ACK feedback channel does not exist, and thus the vehicle A 400 may not determine whether the vehicle B 402 has successfully decoded the data. Therefore, the vehicle A 400 may also retransmit the data to the vehicle B 402 in step 410.

In FIG. 4, each of the vehicle B 402 and the vehicle C 404 may be representative of one vehicle or a plurality of vehicles.

Although vehicle A transmits data to vehicle B and vehicle C in FIGS. 3 and 4, the above-described explicit and implicit methods may also be applied to any case in which vehicle A transmits data to one or more vehicles.

The vehicle B 402 and the vehicle C 404 may be specific vehicles previously identified by the vehicle A 400, or unspecific vehicles not previously identified by the vehicle A 400. When the vehicle B 402 and the vehicle C 404 are specific vehicles, data communication may be performed in a unicast or multicast manner. When the vehicle 402 and the vehicle C 404 are unspecific vehicles, data communication may be performed in a broadcast manner.

Figure 5:
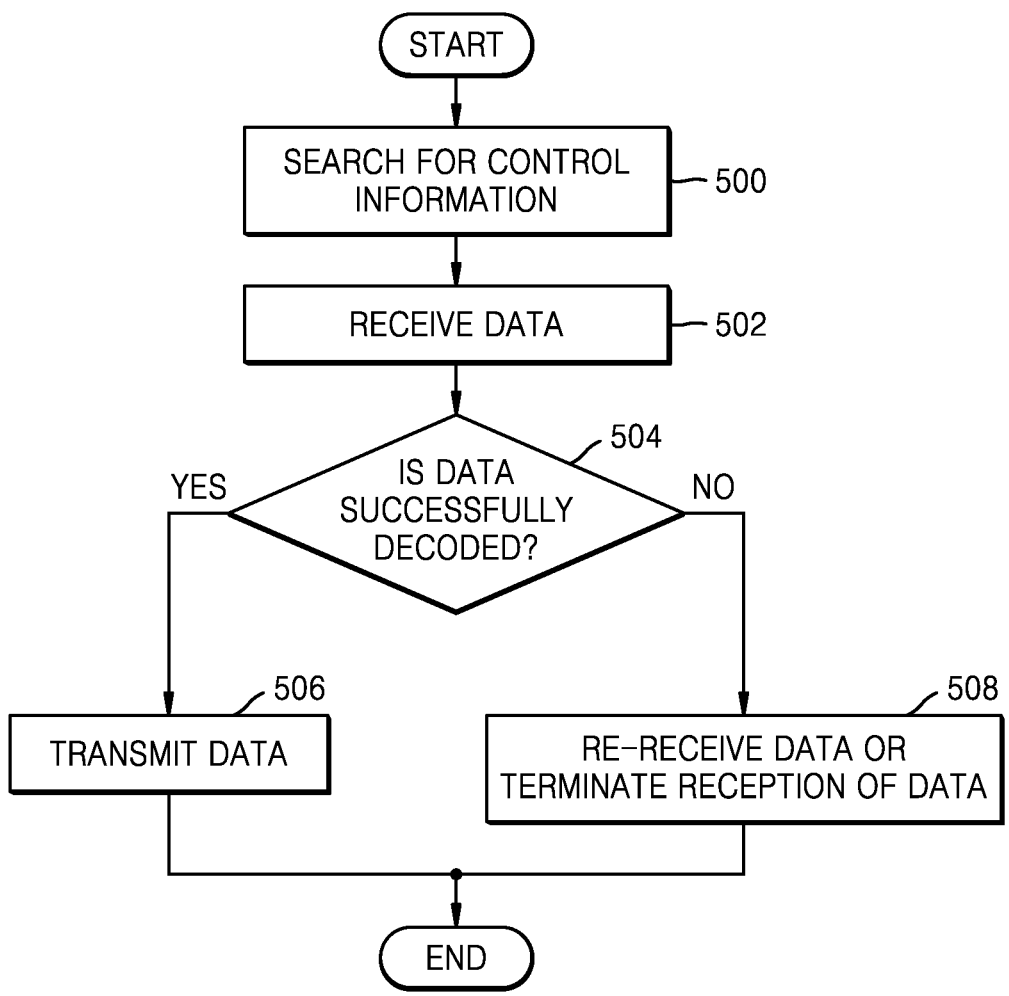
FIG. 5 is a flowchart illustrating an adaptive data communication method of a UE, according to an embodiment.

FIG. 5 is a flowchart illustrating an adaptive data communication method of a UE, according to an embodiment.

Referring to FIG. 5, in step 500, a vehicle searches for control information through a previously configured control channel.

In step 502, when control information is detected, the vehicle receives data in data resource regions indicated by the control information.

In step 504, the vehicle determines whether the received data is successfully decoded. In step 504, upon determining that the data is successfully decoded, the vehicle may determine data resource regions for repeated transmission, based on resource allocation information indicated by the control information.

In step 506, the vehicle transmits the successfully decoded data. The vehicle may transmit the successfully decoded data in the determined data resource regions.

In step 508, the vehicle re-receives the data failed to be decoded, or terminates reception of the data.

When data decoding fails in operation 504, the vehicle may determine data resource regions for repeated transmission, based on resource allocation information indicated by the control information. The vehicle may re-receive the data failed to be decoded, in the determined data resource regions. As another example, when the data decoding fails and when current data transmission is a last transmission, the vehicle may terminate reception of the data.

The vehicle may also consider conditions other than whether the data is successfully decoded or not. The explicit or implicit methods described above in relation to FIG. 4 may be considered.

For example, when the control information includes information indicating whether to relay data, the vehicle may determine whether to relay the received data, based on the information. When the control information indicates to relay data, the vehicle may relay the successfully decoded data. When the control information does not indicate to relay data, the vehicle may not relay the data.

The determining of whether to relay the data may be adaptively performed based on another condition, such as an RNTI, a control information format, control information, a control channel, or a data channel. For example, when the control information or the control channel is a UE-common information or channel, the UE may determine to relay the data. As another example, when the control information or the control channel is a UE-specific information or channel, the UE may determine not to relay the data.

Figure 6:
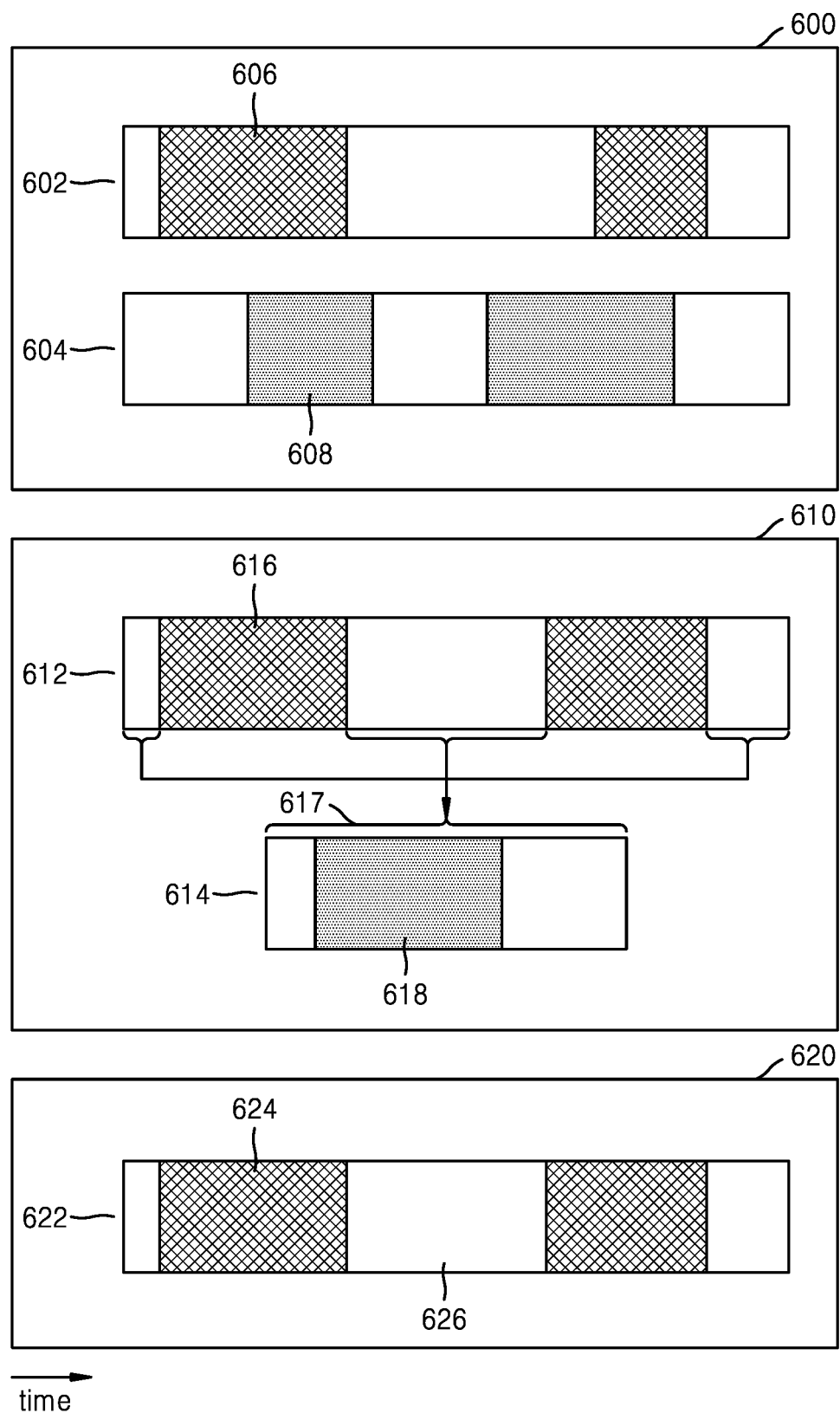
FIG. 6 illustrates a resource allocation method for coexistence of LTE-V2X and NR-V2X, according to an embodiment.

FIG. 6 illustrates a resource allocation method for coexistence of LTE-V2X and NR-V2X, according to an embodiment.

As examples of vehicle communication, LTE-V2X and NR-V2X may have different features. For example, LTE- V2X enables data communication based on turbo coding, whereas NR-V2X enables data communication based on LDPC coding. LTE-V2X and NR-V2X may have different subcarrier spacing values. LTE-V2X and NR-V2X based on different radio access technologies (RATs) may share the same frequency band or at least partially overlapping frequency bands.

Various methods of indicating LTE-V2X resource regions and NR-V2X resource regions may be used. For example, a bitmap configuration method or a method of selecting one of various resource patterns may be used. As another example, the resource allocation method described above in relation to FIG. 2 may be used.

In the bitmap configuration method, each bit indicates whether a symbol, slot, or subframe is used as a resource for V2X. As another example, a method of repeating a time unit indicated by a bitmap, for a certain period may be used. Resources for V2X may be configured not to overlap with resources for transmitting critical system information of LTE or NR, e.g., SS/PBCH.

In method 600, LTE-V2X resource information and NR-V2X resource information may be independently configured for a vehicle. A BS may provide the LTE-V2X resource information and the NR-V2X resource information as separate control information to vehicles in the coverage of the BS. The control information may be UE-common control information or UE-specific control information. The control information for resource configuration may not be configured by the BS but may be configured based on a geographical location defined by the standards or an organization.

When a frequency resource region 602 for LTE-V2X communication is the same as a frequency resource region 604 for NR-V2X communication, LTE-V2X resource regions 606 may be configured for the vehicle based on UE-common control information. In addition, NR-V2X resource regions 608 may be configured for the vehicle based on UE-common control information. In LTE-V2X resource regions in terms of time resources, the vehicle may transmit or receive data related to LTE-V2X services. In NR-V2X resource regions in terms of time resources, the vehicle may transmit or receive data related to NR-V2X services.

In resource regions where the LTE-V2X resources overlap with the NR-V2X resources in terms of time resources, the vehicle may transmit or receive data related to LTE-V2X and NR-V2X services. The above-described operation may be enabled when the same RAT is used for LTE-V2X communication and NR-V2X communication.

As another example, in the resource regions where the LTE-V2X resources overlap with the NR-V2X resources in terms of time resources, the vehicle may transmit or receive only data related to LTE-V2X services. The above-described operation may be enabled when LTE-V2X services require transmission and reception of basic vehicle safety information and thus have a higher priority compared to NR-V2X services.

As another example, in the resource regions where the LTE-V2X resources overlap with the NR-V2X resources in terms of time resources, the vehicle may transmit or receive only data related to NR-V2X services. The above-described operation may be enabled when NR-V2X services have higher communication requirements and thus require a large number of resources compared to LTE-V2X services.

The LTE-V2X services may refer to a type of services for communication through an LTE-V2X network, and include basic safety-related messages for vehicle communication. The NR-V2X services may refer to a type of services for communication through an NR-V2X network, and include services having communication requirements (e.g., a high data rate, a low latency, and a high reliability) not providable by LTE-V2X.

In method 610, LTE-V2X resources may be preferentially configured for a vehicle and then NR-V2X resources may be configured in at least a part of resource regions not used for LTE-V2X communication. For example, NR-V2X resources may be preferentially configured for the vehicle and then LTE-V2X resources may be configured in resource regions not used for NR-V2X communication. That is, although LTE-V2X resources may at least partially overlap with NR-V2X resources in terms of time resources in method 600, the overlapping does not occur in the method 610.

When a frequency resource region 612 for LTE-V2X communication is the same as a frequency resource region 614 for NR-V2X communication, LTE-V2X resource regions 616 may be configured for the vehicle based on UE-common control information. For example, a bitmap method may be used as the resource configuration method. In the bitmap method, each bit may indicate whether a symbol, slot, or subframe is used for LTE-V2X communication. In a resource region 617 remaining after the LTE-V2X resource regions 616 are excluded, an NR-V2X resource region 618 may be separately configured for the vehicle based on UE-common control information. For example, a bitmap method may be used as the resource configuration method. A bitmap size may vary depending on the remaining resource region 617, or the same bitmap size may be maintained and an information period indicated by each bit may be changed or some bits may not be used.

As an example of the bitmap size varying depending on the remaining resource region 617, when each bit is mapped to a subframe the remaining resource region 617 has N subframes, the bitmap size may correspond to N bits. As an example of the information period indicated by each bit changing, when the remaining resource region 617 has a size of T subframes, the N bits of the bitmap are sequentially mapped to $\lceil T/N \rceil$, $\lfloor T/N \rfloor$ subframes. When T is smaller than N, some of the N bits of the bitmap may not be used to indicate resource information for V2X.

Although each bit is mapped to a subframe in the above description, according to another example, each bit may be mapped to various time-period units such as a slot, a symbol, or a symbol group.

In method 620, all periods, other than periods indicated as LTE-V2X resource regions, are configured as NR-V2X resource regions. When only LTE-V2X resource configuration information is received, a vehicle may determine to configure regions not indicated as the LTE-V2X resource regions, as NR-V2X resource regions. The above-described operation may be applied to resource regions except for resource regions that are not usable for LTE-V2X communication or NR-V2X communication. Examples of the not usable resource regions include resource regions for transmitting critical system information, e.g., SS/PBCH, resource regions reserved for future services, and resource regions configured for DL in TDD through upper-layer signaling.

When a frequency resource region 622 for LTE-V2X communication is the same as a frequency resource region 622 for NR-V2X communication, LTE-V2X resource regions 624 may be configured for the vehicle based on UE-common control information. The vehicle may implicitly determine resource regions 626 not configured for LTE-V2X communication, as NR-V2X resource regions. Although the vehicle receives LTE-V2X resource configuration information and implicitly determines NR-V2X resource regions in the above description, the vehicle may receive NR-V2X resource configuration information and implicitly determines LTE-V2X resource regions.

As another example, when the frequency resource region 622 for LTE-V2X communication is the same as the frequency resource region 622 for NR-V2X communication, the LTE-V2X resource regions 624 may be configured for the vehicle based on UE-common control information. When LTE-V2X resources are configured using a bitmap method, the vehicle may configure resources corresponding to bits having a value 1 for NR-V2X communication and configure resources corresponding to bits having a value 0 for LTE-V2X communication.

Figure 7:
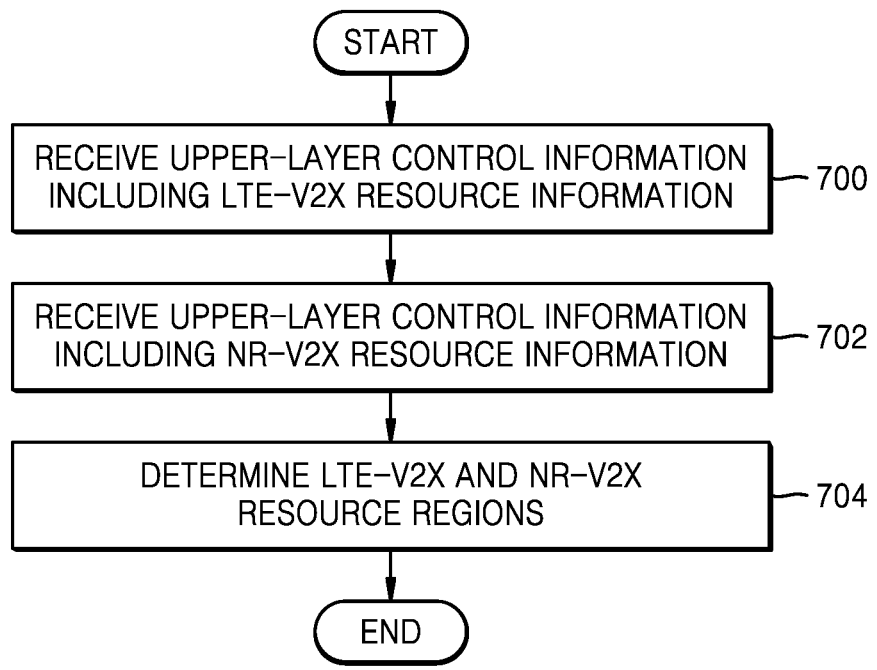
FIG. 7 is a flowchart illustrating UE operations in a resource allocation method for coexistence of LTE-V2X and NR-V2X, according to an embodiment.

FIG. 7 is a flowchart illustrating UE operations in a resource allocation method for coexistence of LTE-V2X and NR-V2X, according to an embodiment.

A vehicle supporting both of LTE-V2X and NR-V2X may receive UE-common control information in previously configured resource regions, and the received UE-common control information may include LTE-V2X resource information or NR-V2X resource information.

Referring to FIG. 7, in step 700, the vehicle receives upper-layer control information including LTE-V2X resource information.

In step 702, the vehicle receives upper-layer control information including NR-V2X resource information.

In step 704, the vehicle determines LTE-V2X and NR-V2X resource regions.

In method 600 of FIG. 6, the LTE-V2X resource information and the NR-V2X resource information operate independently of each other and thus the vehicle may determine that LTE-V2X resources and NR-V2X resources are separately configured based on the two pieces of the resource information.

When the LTE-V2X resources overlap with the NR-V2X resources, the vehicle may determine both as used resources and transmit or receive data, or determine only one of the two as used resources and transmit or receive data through corresponding V2X resources.

In method 610 of FIG. 6, one of the two pieces of the resource allocation information may be determined based on the other piece of the resource allocation information. For example, a UE may receive LTE-V2X resource configuration information and then determine resource regions not configured as LTE-V2X resources, as NR-V2X resource regions. The UE may use the LTE-V2X resource configuration information and the NR-V2X resource configuration information, which are received using different pieces of control information, differently from Embodiment 3-1 of the disclosure.

For example, candidate resource regions for NR-V2X resource regions may correspond to resource regions not indicated as LTE-V2X resource regions. According to the above-described method, candidate resource regions indicatable as LTE-V2X resources may not be changed whereas candidate resource regions indicatable as NR-V2X resources may be changed. Because the candidate resource regions may be changed, time resource regions indicatable by a bitmap for configuring NR-V2X resources may also be changed. Therefore, time resource regions including symbols or slots indicated by bits of the bitmap may be changed.

Figure 8:
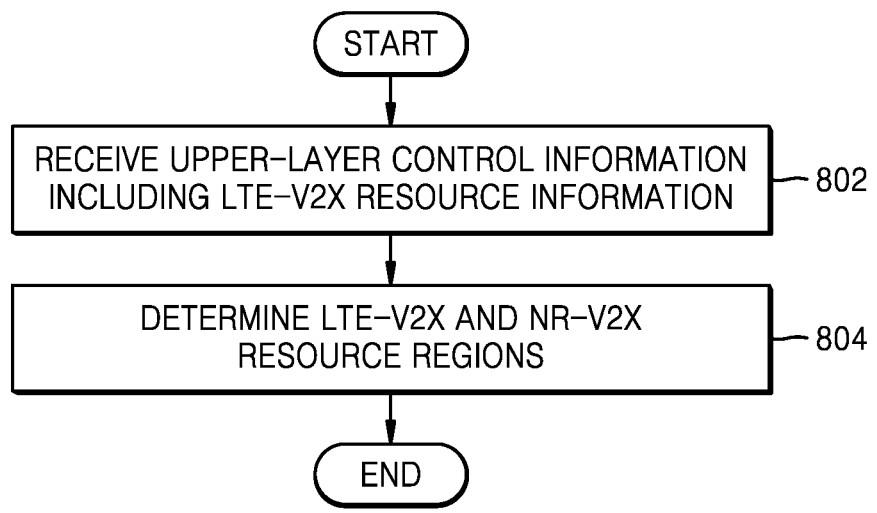
FIG. 8 is a flowchart illustrating UE operations in a resource allocation method for coexistence of LTE-V2X and NR-V2X, according to an embodiment.

FIG. 8 is a flowchart illustrating UE operations in a resource allocation method for coexistence of LTE-V2X and NR-V2X, according to an embodiment.

LTE-V2X and NR-V2X may share the same frequency band but may not be simultaneously used in time resource regions.

Referring to FIG. 8, in step 802, a vehicle receives upper-layer control information including LTE-V2X resource information.

In step 804, the vehicle determines LTE-V2X resource regions and NR-V2X resource regions based on the LTE-V2X resource information. The vehicle may determine resource regions not used for LTE-V2X communication, as NR-V2X resource regions.

For example, assuming that a set of all resource regions allocable for LTE-V2X communication is denoted by A, when B denotes LTE-V2X resource regions from among the resource regions A, NR-V2X resource regions C may be configured as A-B or the complement of B. That is, relations such as, $C \in A$, $B \in A$, and $C = B^C$ may be established. Herein, A may correspond to resource regions except for resource regions allocated for previously configured synchronization signals transmitted for V2X, and broadcast channels for transmitting UE-common control information. In addition, A may correspond to resource regions except for resource regions reserved for future use or resource regions used for DL (or resource regions configured for non-UL links).

Figure 9:
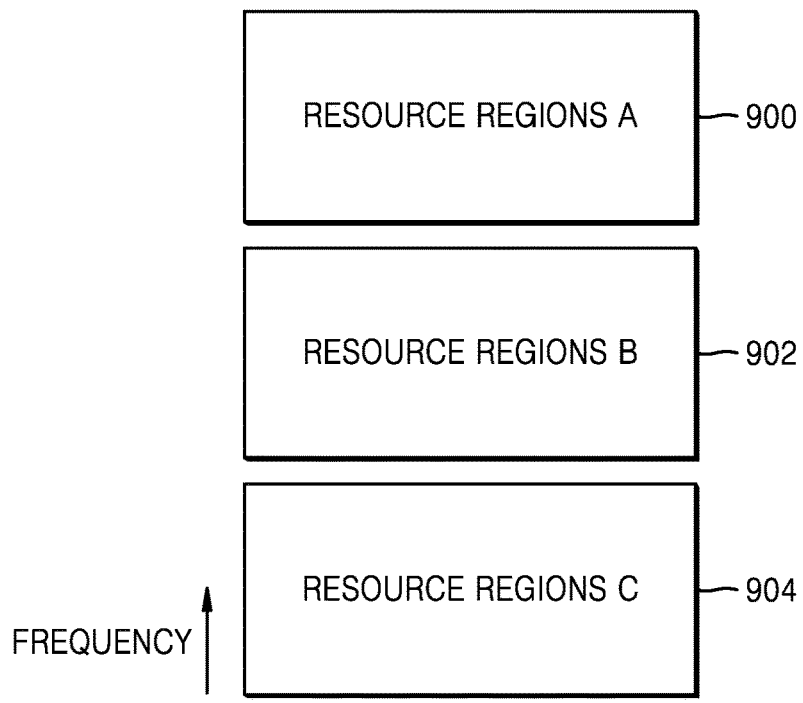
FIG. 9 illustrates a method of indicating a waveform used in transmission resource regions and reception resource regions of UEs, according to an embodiment.

FIG. 9 illustrates a method of indicating a waveform used in transmission resource regions and reception resource regions of vehicles, according to an embodiment.

FIG. 9 illustrates resource regions (or resource pools) configurable for the vehicles based on upper-layer control information from a BS, or based on a geographical location. The resource regions may be divided into transmission resource regions in which a vehicle transmits data and reception resource regions in which a vehicle receives data. The transmission and reception resource regions may have the same or different frequency resource regions. One or more resource regions may be simultaneously configured.

The number of resource regions configured as the transmission resource region may be the same as or different from the number of resource regions configured as the reception resource regions. The transmission resource regions may have the same or different sizes, and the reception resource regions may have the same or different sizes.

A waveform of a vehicle supporting NR-V2X may support both OFDM and DFT-s-OFDM or SC-FDMA. OFDM may provide a higher performance compared to DFT-S-OFDM but requires much power consumption at a transmitter. When a transmitter vehicle and a receiver vehicle perform data communication by assuming different waveforms therebetween, appropriate data communication may not be performed. Therefore, the transmitter vehicle and the receiver vehicle perform data communication by assuming the same waveform therebetween. Methods for enabling the above-described operation will now be described.

In a first method for a transmitter vehicle and a receiver vehicle to use the same waveform, a BS may indicate a waveform used for data communication of the vehicles, based on UE-common upper-layer control information. For example, the BS may signal a waveform used for data communication of the vehicles, at a specific timing based on NR-RMSI or MIB.

In a second method for a transmitter vehicle and a receiver vehicle to use the same waveform, a BS may signal a waveform used for data communication of the vehicles, based on message 2 or message 4 in a random access procedure for synchronization acquisition and data communication.

In a third method for a transmitter vehicle and a receiver vehicle to use the same waveform, a BS may signal resource regions (or resource pools) for data communication of the vehicles, based on UE-common upper-layer control information by using a waveform associated with the resource regions.

Referring to FIG. 9, when the BS indicates transmission resource regions as resource regions A 900 and B 902, and indicates reception resource regions as resource regions A 900, B 902, and C 904, based on UE-common upper-layer control information, the resource regions A 900 and C 904 may be configured for transmitting and receiving data by using DFT-S-OFDM, and the resource regions B 902 be configured for transmitting and receiving data by using OFDM.

In a fourth method for a transmitter vehicle and a receiver vehicle to use the same waveform, when resource regions are determined based on a geographical location, data communication may be performed using a waveform associated with the resource regions.

For example, in FIG. 9, when data communication is performed through the resource regions A 900 in area a, performed through the resource regions B 902 in area b, and performed through the resource regions C 904 in area c, the vehicles may use a waveform determined for each resource region, without previous signaling. Examples of the waveform used without previous signaling may include a waveform defined per resource region by the standards and a waveform defined per resource region by a country or a service provider.

In a fifth method for a transmitter vehicle and a receiver vehicle to use the same waveform, data communication may be performed using a waveform configured based on a communication mode in which the vehicles operate.

LTE-V2X include mode 3 in which the vehicles perform communication through resources allocated by a BS, and mode 4 in which the vehicles sense and use resources without intervention of the BS. The vehicles may perform data communication by applying OFDM or DFT-S-OFDM based on a mode in which the vehicles operate. For example, the vehicles may perform data communication by using OFDM in mode 3, and perform data communication by using DFT-S-OFDM in mode 4.

Alternatively, when LTE/NR includes a connected mode and an idle mode, the vehicles may perform data communication by applying OFDM or DFT-S-OFDM based on a mode. For example, the vehicles may perform data communication by using OFDM in the connected mode, and perform data communication by using DFT-S-OFDM in the idle mode.

LTE-V2X may also include an in-coverage mode in which the vehicles operate within the coverage of the BS, and an out-of-coverage mode in which the vehicles operate outside the coverage of the BS. The vehicles may perform data communication by applying OFDM or DFT-S-OFDM based on the in-coverage mode or the out-of-coverage mode. For example, the vehicles may perform data communication by using OFDM in the in-coverage mode, and perform data communication by using DFT-S-OFDM in the out-of-coverage mode.

In a sixth method for a transmitter vehicle and a receiver vehicle to use the same waveform, data communication may be performed using a waveform configured based on a communication mode in which the vehicles operate.

LTE-V2X include mode 3 in which the vehicles perform communication through resources allocated by a BS, and mode 4 in which the vehicles sense and use resources without intervention of the BS. The vehicles may perform data communication by applying OFDM or DFT-S-OFDM based on a mode in which the vehicles operate. The vehicles may perform data communication by using DFT-S-OFDM in mode 3, and perform data communication by using OFDM in mode 4.

As another example, when LTE/NR includes a connected mode and an idle mode, the vehicles may perform data communication by applying OFDM or DFT-S-OFDM based on a mode. The vehicles may perform data communication by using DFT-S-OFDM in the connected mode, and perform data communication by using OFDM in the idle mode.

As another example, when LTE-V2X includes an in-coverage mode in which the vehicles operate within the coverage of the BS, and an out-of-coverage mode in which the vehicles operate outside the coverage of the BS, the vehicles may perform data communication by applying OFDM or DFT-S-OFDM based on a mode. The vehicles may perform data communication by using DFT-S-OFDM in the in-coverage mode, and perform data communication by using OFDM in the out-of-coverage mode.

Although OFDM or DFT-S-OFDM is described as an example above, other waveforms may also be applied, and the above-described methods may also be applied when two or more waveforms are supported. The waveforms may also be applied in an opposite manner from the afore-described embodiments of the disclosure.

Figure 10:
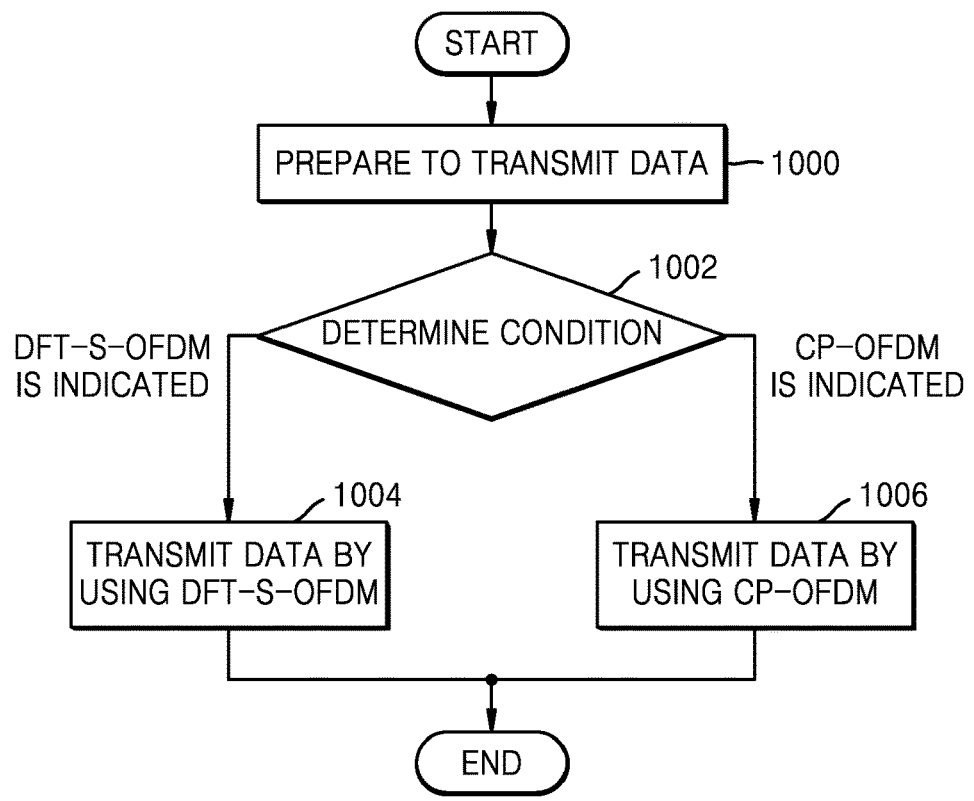
FIG. 10 is a flowchart illustrating a waveform selection method for data communication of a UE in terms of transmission, according to an embodiment.

FIG. 10 is a flowchart illustrating a waveform selection method for data communication of a UE in terms of transmission, according to an embodiment.

Referring to FIG. 10, in step 1000, the UE prepares to transmit data.

In step 1002, the UE determines whether a condition indicates an SL transmission waveform as DFT-S-OFDM or cyclic prefix-OFDM (CP-OFDM).

For example, the condition may be about whether information provided from a BS through upper-layer signaling indicates the SL transmission waveform as DFT-S-OFDM or CP-OFDM. The SL transmission waveform may be indicated using 1 bit.

In step 1004, when DFT-S-OFDM is indicated, the UE transmits the data by using DFT-S-OFDM.

In step 1006, when CP-OFDM is indicated, the UE transmits the data by using CP-OFDM.

As another example, the condition may be about whether information included in message 1 or message 3 in a random access procedure indicates the SL transmission waveform as DFT-S-OFDM or CP-OFDM. When DFT-S-OFDM is indicated, the UE may transmit the data by using DFT-S-OFDM. When CP-OFDM is indicated, the UE may transmit the data by using CP-OFDM.

As another example, the condition may be about whether information indicated in association with resource regions configured through upper-layer signaling indicates the SL transmission waveform as DFT-S-OFDM or CP-OFDM. When the UE desires to transmit the data through specific resource regions, an SL transmission waveform configured for the resource regions may be applied. When the SL transmission waveform configured for the resource regions is indicated as DFT-S-OFDM, the UE may transmit the data by using DFT-S-OFDM. When the SL transmission waveform configured for the resource regions is indicated as CP-OFDM, the UE may transmit the data by using CP-OFDM.

As another example, the condition may be about whether information indicated in association with resource regions configured based on UE-common upper-layer control information indicates the SL transmission waveform as DFT-S-OFDM or CP-OFDM. When the UE desires to transmit the data through specific resource regions, an SL transmission waveform configured for the resource regions may be applied. When the SL transmission waveform configured for the resource regions is indicated as DFT-S-OFDM, the UE may transmit the data by using DFT-S-OFDM. When the SL transmission waveform configured for the resource regions is indicated as CP-OFDM, the UE may transmit the data by using CP-OFDM. The resource regions may be configured based on the UE-common upper-layer control information or be previously defined based on a geographical location.

As another example, the condition may be about whether the SL transmission waveform is indicated as DFT-S-OFDM or CP-OFDM based on mode 3 in which the UE requests SL resources from the BS and transmits data through resources allocated by the BS, or mode 4 in which the UE transmits data through resources autonomously sensed and determined as being not used. The UE may transmit the data by using DFT-S-OFDM in mode 3, or transmit the data by using CP-OFDM in mode 4. A waveform mapped to each mode may be configured by the BS or determined by a service provider or the standards.

As another example, the condition may be about whether the SL transmission waveform is indicated as DFT-S-OFDM or CP-OFDM based on an in-coverage mode in which the UE is in the coverage of the BS, and an out-of-coverage mode in which the UE is not in the coverage of the BS. The UE may use DFT-S-OFDM in the out-of-coverage mode, or use CP-OFDM in the in-coverage mode. A waveform mapped to each mode may be configured by the BS or determined by a service provider or the standards.

Figure 11:
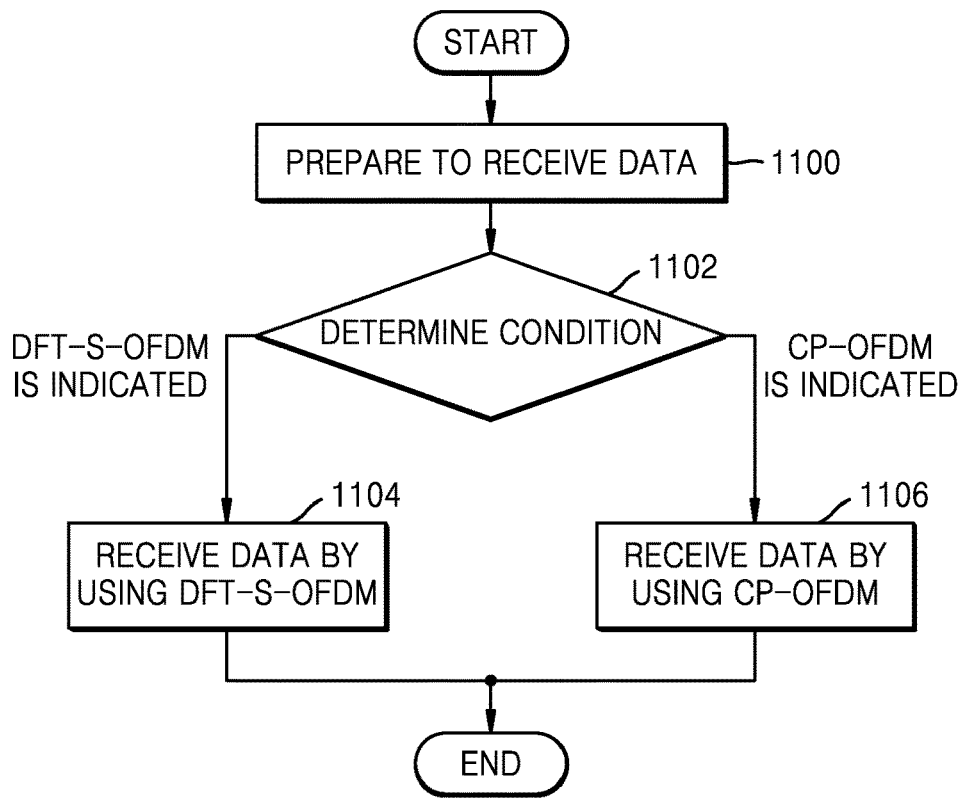
FIG. 11 is a flowchart illustrating a waveform selection method for data communication of a UE in terms of reception, according to an embodiment.

FIG. 11 is a flowchart illustrating a waveform selection method for data communication of a UE in terms of reception, according to an embodiment.

Referring to FIG. 11, in step 1100, the UE prepares to receive data before a waveform of a signal received by a radio frequency (RF) front end is determined.

In step 1102, the UE determines whether a condition indicates an SL reception waveform as DFT-S-OFDM or CP-OFDM.

For example, the condition may be about whether information provided from a BS through upper-layer signaling indicates the SL reception waveform as DFT-S-OFDM or CP-OFDM. Herein, the SL reception waveform may be indicated using 1 bit.

In step 1104, when DFT-S-OFDM is indicated, the UE receives the data by using DFT-S-OFDM.

In step 1106, when CP-OFDM is indicated, the UE receives the data by using CP-OFDM.

As another example, the condition may be about whether information included in message 1 or message 3 in a random access procedure indicates the SL reception waveform as DFT-S-OFDM or CP-OFDM. When DFT-S-OFDM is indicated, the UE may receive the data by using DFT-S-OFDM. When CP-OFDM is indicated, the UE may receive the data by using CP-OFDM.

As another example, the condition may be about whether information indicated in association with resource regions configured through upper-layer signaling indicates the SL reception waveform as DFT-S-OFDM or CP-OFDM. When the UE desires to receive the data through specific resource regions, an SL reception waveform configured for the resource regions may be applied. When the SL reception waveform configured for the resource regions is indicated as DFT-S-OFDM, the UE may receive the data by using DFT-S-OFDM. When the SL reception waveform configured for the resource regions is indicated as CP-OFDM, the UE may receive the data by using CP-OFDM.

As another example, the condition may be about whether information indicated in association with resource regions configured based on UE-common upper-layer control information indicates the SL reception waveform as DFT-S-OFDM or CP-OFDM. When the UE desires to receive the data through specific resource regions, an SL reception waveform configured for the resource regions may be applied. For example, when the SL reception waveform configured for the resource regions is indicated as DFT-S-OFDM, the UE may receive the data by using DFT-S-OFDM. When the SL reception waveform configured for the resource regions is indicated as CP-OFDM, the UE may receive the data by using CP-OFDM. The resource regions may be configured based on the UE-common upper-layer control information or be previously defined based on a geographical location.

As another example, the condition may be about whether the SL reception waveform is indicated as DFT-S-OFDM or CP-OFDM based on an in-coverage mode in which the UE is in the coverage of the BS, and an out-of-coverage mode in which the UE is not in the coverage of the BS. The UE may use DFT-S-OFDM in the out-of-coverage mode, or use CP-OFDM in the in-coverage mode. A waveform mapped to each mode may be configured by the BS or determined by a service provider or the standards.

Figure 12:
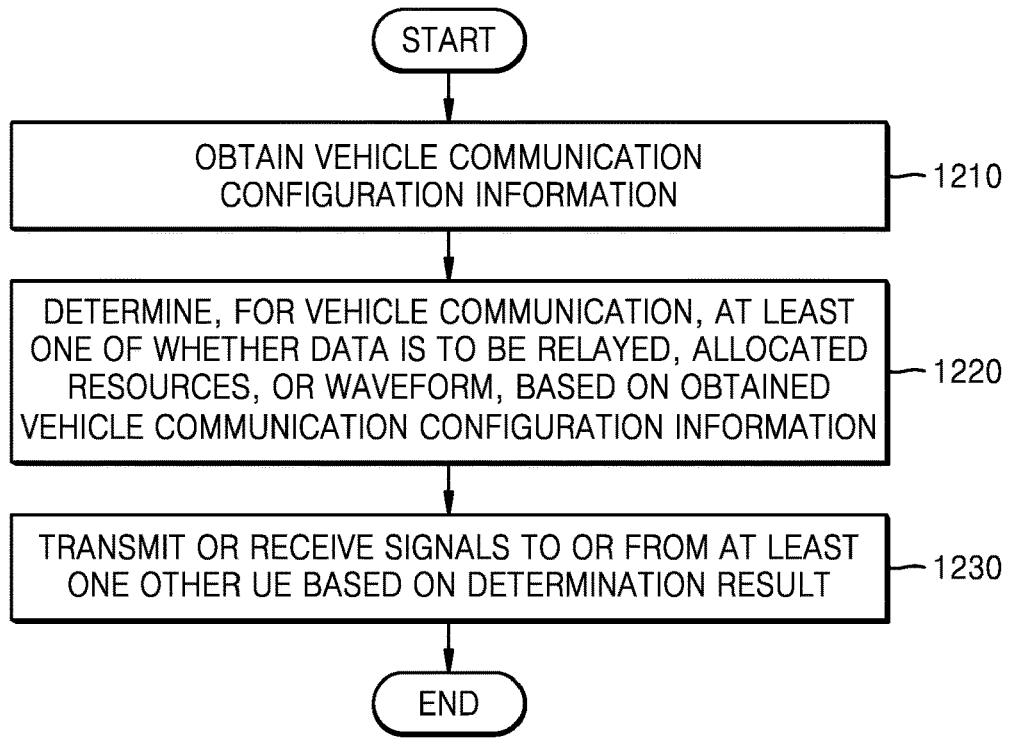
FIG. 12 is a flowchart illustrating a signal transmission and reception method of a UE in a wireless vehicle communication system, according to an embodiment.

FIG. 12 is a flowchart illustrating a signal transmission and reception method of a UE in a wireless vehicle communication system, according to an embodiment.

Referring to FIG. 12, in step 1210, the UE obtains vehicle communication configuration information.

The vehicle communication configuration information may be included in at least one of a MAC CE, RRC configuration information, or DL control information. As another example, the vehicle communication configuration information may be included in a message received in a random access procedure.

However, the above description merely corresponds to an example and the UE may implicitly obtain the vehicle communication configuration information by identifying at least one of an RNTI scrambled in control information including at least one of the MAC CE, the RRC configuration information, or the DL control information, a format of the control information, a transmission channel of the control information, a transmission method of data, or transmission resources of the data. Alternatively, the UE may implicitly obtain the vehicle communication configuration information by identifying a vehicle communication mode of the UE, which is determined based on at least one of a location of the UE, intervention of a BS in vehicle communication, an operating location of the UE based on coverage, or wireless connection establishment between the UE and the BS.

In step 1220, the UE determines, for vehicle communication, at least one of whether data is to be relayed, allocated resources, or a waveform, based on the obtained vehicle communication configuration information.

For example, the UE may determine whether to relay data received by the UE, to at least one other UE based on the vehicle communication configuration information. A method by which the UE determines whether to relay the data may correspond to the methods described above in relation to FIGS. 4 and 5.

As another example, the UE may determine resources for first-type vehicle communication and resources for second-type vehicle communication, based on the vehicle communication configuration information. A method by which the UE determines the resources for each type of vehicle communication may correspond to the methods described above in relation to FIGS. 6 to 8.

As another example, the UE may determine a waveform for vehicle communication, based on the vehicle communication configuration information. A method by which the UE determines the waveform may correspond to the methods described above in relation to FIGS. 9 to 11.

In step 1230, the UE transmits or receives signals to or from at least one other UE based on the determination result.

Figure 13:
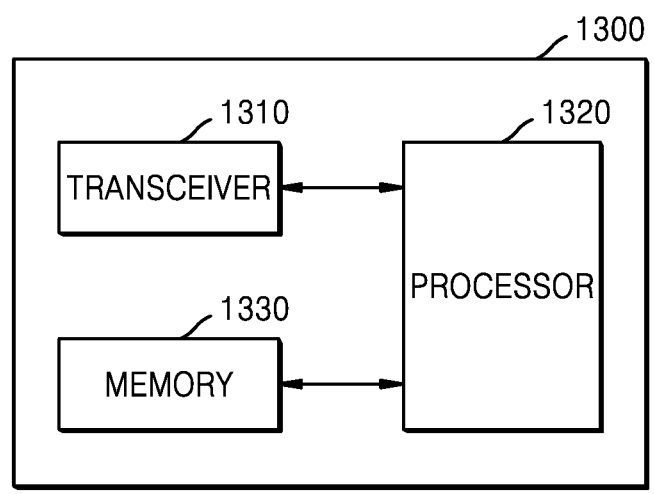
FIG. 13 illustrates a UE according to an embodiment.

FIG. 13 illustrates a UE according to an embodiment.

Referring to FIG. 13, the UE 1300 includes a transceiver 1310, a processor 1320, and a memory 1330.

The transceiver 1310 may be separated into a transmitter and a receiver.

The transceiver 1310 may transmit or receive signals to or from a BS or other UEs. The signals may include control information and data. The transceiver 1310 may include an RF transmitter for up-converting a frequency of and amplifying a signal to be transmitted, and an RF receiver for low-noise amplifying and down-converting a frequency of a received signal. The transceiver 1310 may receive a signal through a wireless channel and provide the signal to the processor 1320, and transmit a signal output from the processor 1320, through a wireless channel.

The processor 1320 may control a series of procedures to operate the UE 1300 according to the above-described embodiments of the disclosure.

The memory 1330 may store vehicle communication configuration information, control information, or data, and have an area for storing data required for and generated due to controlling operation of the processor 1320. The memory 1330 may be configured in various forms, e.g., read-only memory (ROM), random access memory (RAM), a hard disk, a compact disc (CD)-ROM, and a digital versatile disc (DVD).

Figure 14:
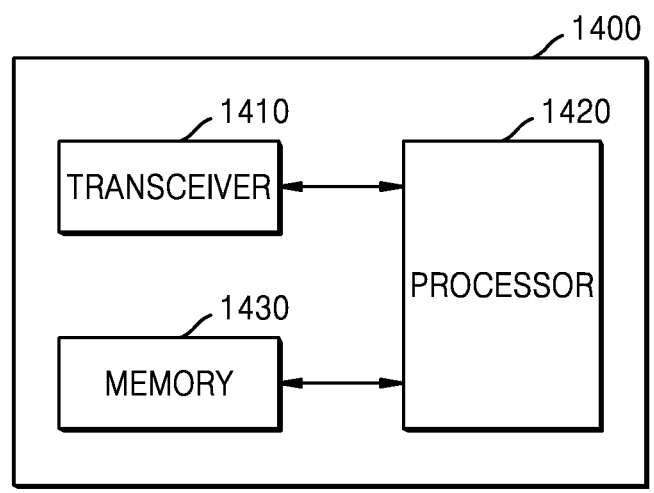
FIG. 14 illustrates a base station according to an embodiment.

FIG. 14 illustrates a BS according to an embodiment.

Referring to FIG. 14, the BS 1400 includes a transceiver 1410, a processor 1420, and a memory 1430.

The transceiver 1410 may be separated into a transmitter and a receiver.

The transceiver 1410 may transmit or receive signals to or from UEs. The signals may include control information and data. The transceiver 1410 may include an RF transmitter for up-converting a frequency of and amplifying a signal to be transmitted, and an RF receiver for low-noise amplifying and down-converting a frequency of a received signal. The transceiver 1410 may receive a signal through a wireless channel and provide the signal to the processor 1420, and transmit a signal output from the processor 1420, through a wireless channel. The processor 1420 may control a series of procedures to operate the BS 1400 according to the above-described embodiments of the disclosure.

The memory 1430 may store vehicle communication configuration information, control information, or data, and have an area for storing data required for and generated due to controlling operation of the processor 1420. The memory 1430 may be configured in various forms, e.g., ROM, RAM, a hard disk, a CD-ROM, and a DVD.

The above-described embodiments should be considered in a descriptive sense only and not for purposes of limitation. That is, one of ordinary skill in the art will understand that various changes in form and details may be made in the embodiments of the disclosure without departing from the scope as defined by the following claims.

The embodiments of the disclosure may be combined as necessary. For example, a BS and a UE may operate according to a combination of parts of the embodiments of the disclosure.

Although the embodiments of the disclosure have been described with reference to NR systems, the embodiments are also applicable to other systems, such as FDD or TDD LTE systems.

According to the disclosure, by configuring a vehicle communication method, e.g., whether to relay data, allocated resources, and a waveform, based on vehicle communication configuration information in a wireless vehicle communication system, data transmission reliability may be increased and different communication types may be adaptively configured for a UE.

While specific terms have been used to describe various embodiments of the disclosure with reference to the attached drawings, those terms are merely for convenience of explanation and for a better understanding of the disclosure and do not limit the scope of the disclosure.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method of transmitting or receiving a signal by a user equipment (UE) in a wireless sidelink communication system, the method comprising:
   receiving sidelink communication configuration information;
   receiving sidelink control information (SCI) associated with a long term evolution (LTE) network;
   based on the sidelink communication configuration information, identifying whether a first sidelink signal using the LTE network and a second sidelink signal using a new radio (NR) network overlap in time;
   in response to identifying that the first sidelink signal using the LTE network and the second sidelink signal using the NR network overlap in time, identifying whether a priority of the first sidelink signal is higher than a priority of the second sidelink signal based on a priority field included in the SCI; and
   transmitting, to at least one other UE, a signal with a higher priority among the first sidelink signal or the second sidelink signal,
   wherein a sidelink resource includes resource regions except resource regions previously configured for synchronization signal (SS) or physical broadcast channel (PBCH).

2. The method of claim 1, further comprising determining whether data is to be relayed, and whether a waveform to be used is the same at the at least one other UE, based on the received sidelink communication configuration information,
   wherein the sidelink communication configuration information is included in at least one of a media access control (MAC) control element (CE), radio resource control (RRC) configuration information, or downlink (DL) control information, and
   wherein determining whether the data is to be relayed comprises determining whether to relay received data to the at least one other UE, based on the sidelink communication configuration information.

3. The method of claim 1, further comprising determining whether data is to be relayed, and whether a waveform to be used is the same at the at least one other UE, based on the received sidelink communication configuration information,
wherein receiving the sidelink communication configuration information comprises identifying at least one of a radio network temporary identifier (RNTI) scrambled in control information including at least one of a media access control (MAC) control element (CE), radio resource control (RRC) configuration information, or downlink (DL) control information, a format of the control information, a transmission channel of the control information, a transmission method of data, or transmission resources of the data, and
wherein determining whether the data is to be relayed comprises determining whether the UE is to relay received data to the at least one other UE, based on the identification result.

4. The method of claim 1, further comprising determining resources for first-type sidelink communication and resources for second-type sidelink communication in a time-frequency resource region, based on resource information for the first-type sidelink communication and resource information for the second-type sidelink communication, the resource information being received from the sidelink communication configuration information.

5. The method of claim 1, further comprising:
determining resources for first-type sidelink communication in a time-frequency resource region, based on resource information for the first-type sidelink communication, the resource information being received from the sidelink communication configuration information; and
determining resources for second-type sidelink communication, based on resource information for the second-type sidelink communication from among resources remaining after the resources for the first-type sidelink communication in the time-frequency resource region are excluded.

6. The method of claim I. further comprising:
determining resources for first-type sidelink communication in a time-frequency resource region, based on resource information for the first-type sidelink communication, the resource information being received from the sidelink communication configuration information; and
determining resources remaining after the resources for the first-type sidelink communication in the time-frequency resource region are excluded, as resources for second-type sidelink communication.

7. The method of claim 1, wherein receiving the sidelink communication configuration information comprises receiving the sidelink communication configuration information indicating a waveform, from UE-common upper-layer control information received from a base station, or from a message received in a random access procedure, and
wherein a format of the waveform is determined based on the sidelink communication configuration information.

8. The method of claim 1, wherein receiving the sidelink communication configuration information comprises identifying resource regions usable for data communication of the UE, based on UE-common upper-layer control information received from a base station, and
wherein a waveform of the UE is determined as being associated with the identified resource regions.

9. The method of claim 1, wherein receiving the sidelink communication configuration information comprises identifying resource regions usable for data communication of the UE, based on a location of the UE, and
wherein a waveform of the UE is determined as being associated with the identified resource regions.

10. The method of claim 1, wherein receiving the sidelink communication configuration information comprises identifying a sidelink communication mode of the UE, based on at least one of intervention of a base station in sidelink communication, an operating location of the UE based on coverage, or wireless connection establishment between the UE and the base station, and
wherein a waveform of the UE is determined as being associated with the identified sidelink communication mode.

11. A user equipment (UE) for transmitting and receiving signals in a wireless sidelink communication system, the UE comprising:
a transceiver; and
at least one processor connected with the transceiver and configured to:
receive sidelink communication configuration information,
receive sidelink control information (SCI) associated with a long term evolution (LTE) network,
based on the sidelink communication configuration information, identify whether a first sidelink signal using the LTE network and a second sidelink signal using a new radio (NR) network overlap in time,
in response to identifying that the first sidelink signal using the LTE network and the second sidelink signal using the NR network overlap in time, identify whether a priority of the first sidelink signal is higher than a priority of the second sidelink signal based on a priority field included in the SCI, and
transmit or receive, to or from at least one other UE, a signal with a higher priority among the first sidelink signal or the second sidelink signal,
wherein a sidelink resource includes resource regions except resource regions previously configured for synchronization signal (SS) or physical broadcast channel (PBCH).

12. The UE of claim II, wherein the processor is further configured to determine whether data is to be relayed, and to determine whether a waveform to be used is the same at the at least one other UE, based on the received sidelink communication configuration information, and
wherein the sidelink communication configuration information is included in at least one of a media access control (MAC) control element (CE), radio resource control (RRC) configuration information, or downlink (DL) control information, and
wherein the processor is further configured to determine whether the UE is to relay received data to the at least one other UE, based on the sidelink communication configuration information.

13. The UE of claim 11, wherein the processor is further configured to:
determine whether data is to be relayed,
determine whether a waveform to be used is the same at the at least one other UE, based on the received sidelink communication configuration information,
identify at least one of a radio network temporary identifier (RNTI) scrambled in control information including at least one of a media access control (MAC) control element (CE), radio resource control (RRC) configuration information, or downlink (DL) control information, a format of the control information, a transmission channel of the control information, a transmission method of data, or transmission resources of the data, and determine whether the UE is to relay received data to the at least one other UE, based on the identification result.

14. The UE of claim 11, wherein the processor is further configured to determine resources for first-type sidelink communication and resources for second-type sidelink communication in a time-frequency resource region, based on resource information for the first-type sidelink communication and resource information for the second-type sidelink communication, the resource information being received from the sidelink communication configuration information.

15. The UE of claim 11, wherein the processor is further configured to:

determine resources for first-type sidelink communication in a time-frequency resource region, based on resource information for the first-type sidelink communication, the resource information being received from the sidelink communication configuration information, and determine resources for second-type sidelink communication, based on resource information for the second-type sidelink communication from among resources remaining after the resources for the first-type sidelink communication in the time-frequency resource region are excluded.

16. The UE of claim 11, wherein the processor is further configured to:

determine resources for first-type sidelink communication in a time-frequency resource region, based on resource information for the first-type sidelink communication, the resource information being received from the sidelink communication configuration information, and determine resources remaining after the resources for the first-type sidelink communication in the time-frequency resource region are excluded, as resources for second-type sidelink communication.

17. The UE of claim 11, wherein the processor is further configured to:

receive sidelink communication configuration information indicating the waveform, from UE-common upper-layer control information received from a base station, or from a message received in a random access procedure, and determine a format of a waveform based on the sidelink communication configuration information.

18. The UE of claim 11, wherein the processor is further configured to:

identify resource regions usable for data communication of the UE, based on UE-common upper-layer control information received from a base station, and determine a waveform of the UE as being associated with the identified resource regions.

19. The UE of claim 11, wherein the processor is further configured to:

identify resource regions usable for data communication of the UE, based on a location of the UE, and determine a waveform of the UE as being associated with the identified resource regions.

20. The UE of claim 11, wherein the processor is further configured to:

identify a sidelink communication mode of the UE, based on at least one of intervention of a base station in sidelink communication, an operating location of the UE based on coverage, or wireless connection establishment between the UE and the base station, and determine a waveform of the UE as being associated with the identified sidelink communication mode.

\* \* \* \* \*

UNITED STATES PATENT AND TRADEMARK OFFICE
CERTIFICATE OF CORRECTION

| | | |
|---|---|---|
| PATENT NO. | : 11,540,097 B2 | Page 1 of 1 |
| APPLICATION NO. | : 16/429966 | |
| DATED | : December 27, 2022 | |
| INVENTOR(S) | : Sungjin Park et al. | |

It is certified that error appears in the above-identified patent and that said Letters Patent is hereby corrected as shown below:

In the Claims

In Column 24, Line 40, Claim 12:
"The UE of claim II, wherein the processor is further"

Should be:
-- The UE of claim 11, wherein the processor is further --

Signed and Sealed this
Eleventh Day of March, 2025

Coke Morgan Stewart
*Acting Director of the United States Patent and Trademark Office*